United States Patent [19]

Honda

[11] Patent Number: 4,471,730

[45] Date of Patent: Sep. 18, 1984

[54] FOUR-CYCLE INTERNAL COMBUSTION ENGINE AND ASSOCIATED METHODS OF FUEL COMBUSTION

[75] Inventor: Shoichi Honda, Tokyo, Japan

[73] Assignee: Honda Giken Kogyo Kabushiki Kaisha, Tokyo, Japan

[21] Appl. No.: 437,842

[22] Filed: Oct. 29, 1982

Related U.S. Application Data

[63] Continuation of Ser. No. 180,821, Aug. 25, 1980, Pat. No. 4,363,300.

[51] Int. Cl.³ .............................................. F02F 3/28
[52] U.S. Cl. ................................. 123/90.27; 92/177; 123/315
[58] Field of Search ............... 123/193 R, 193 P, 432, 123/315; 92/277

[56] References Cited

U.S. PATENT DOCUMENTS

| | | | |
|---|---|---|---|
| 1,504,095 | 8/1924 | Burtnett | 123/90.38 |
| 1,896,163 | 2/1933 | Champion | 123/315 |
| 4,256,068 | 3/1981 | Irimajiri et al. | 92/177 |
| 4,363,300 | 12/1982 | Honda | 123/315 |

FOREIGN PATENT DOCUMENTS 1292444  4/1969  Fed. Rep. of Germany ...... 123/315

Primary Examiner—Craig R. Feinberg
Attorney, Agent, or Firm—Posnack, Roberts, Cohen & Spiecens

[57] ABSTRACT

A four-cycle internal combustion engine comprising a cylinder bore formed in a cylinder block, a piston slidably fitted in the cylinder bore, and a combustion chamber formed in a cylinder head above the piston. The bore, piston and combustion chamber have an elongated non-circular cross-section which, for example, can be of elongated circular or elliptical shape. An intake system for fuel mixture is connected to the combustion chamber to supply fuel mixture to a central region of the combustion chamber and an exhaust system is connected to each end of the combustion chamber in an outer region for discharge of exhaust gases.

17 Claims, 5 Drawing Figures

FOUR-CYCLE INTERNAL COMBUSTION ENGINE AND ASSOCIATED METHODS OF FUEL COMBUSTION

This application is a continuation of application Ser. No. 180,821, filed Aug. 25, 1980 now U.S. Pat. No. 4,363,300.

FIELD OF THE INVENTION

This invention relates to a four-cycle internal combustion engine and to associated methods of fuel combustion. Each cylinder bore in the engine is formed in a cylinder block and a piston is slidably fitted in the bore. A combustion chamber is formed in a cylinder head above the piston and the bore, piston and combustion chamber are of elongated non-circular cross-section and, for example, can be of elongated circular or elliptical shape (hereinafter referred to as an "elliptical engine").

PRIOR ART

The Applicants have already proposed a four-cycle elliptical engine which is compact and produces high output. However, such elliptical engine is longer in the direction of the major axis of the cross-section of the combustion chamber as compared with the ordinary internal combustion engine having a combustion chamber of circular shape in cross-section, so that technical problems exist as to combustion of the mixture in the combustion chamber. Thus, it is desired that the mixture be burned more quickly for developing higher combustion efficiency which would compare favorably with the ordinary engine.

SUMMARY OF THE INVENTION

An object of this invention is to provide an elliptical, four-cycle, internal combustion engine having good combustion which takes places quickly and positively by reducing the distance of combustion propagation in the combustion chamber of elongated circular or elliptical shape in cross-section.

It is another object of this invention to provide an elliptical, four-cycle, internal combustion engine in which the durability of the pistons are increased by introducing fuel mixture into a central region of the combustion chamber thereby improving the cooling of the piston head.

In accordance with the invention, there is provided an elliptical, four-cycle internal combustion engine in which the piston, bore and combustion chamber have an elongated, non-circular transverse cross-section with a major longitudinal axis and a minor transverse axis and wherein the combustion chamber has a central region and an outer region. An inlet means serves for introducing fuel mixture into the central region of the combustion chamber and a discharge means serves for discharging exhaust gases at the outer region of the combustion chamber.

According to a feature of the invention, the inlet means comprises inlet valves and the discharge means comprises exhaust valves and these are arranged in respective pairs in parallel rows and are inclined inwardly into the combustion chamber along lines which intersect at respective common points. This serves to shorten the propagation distance of the combustion flame front thereby curtailing combustion duration. Additionally, the cold fuel mixture introduced into the central region of the combustion chamber provides effective cooling of the piston head leading to longer piston life.

In further accordance with the invention, there is provided a method in which the fuel mixture is introduced into the central region of the combustion chamber and the exhaust gases are discharged at the outer region of the combustion chamber, the introduction of the fuel mixture and the discharge of the exhaust gases being effected in a plane parallel to the major longitudinal axis.

In accordance with a particular feature of the method, the fuel mixture is introduced into and the exhaust gases are discharged from the combustion chamber in two vertical planes equally spaced on opposite sides of a vertical plane passing through the longitudinal axis.

The invention will be described in greater detail with references to the annexed drawing.

DETAILED DESCRIPTION

Referring to the attached drawing, therein is seen a four-cylinder, four-cycle internal combustion engine comprising a cylinder block 1 with a cylinder head 2 thereon and a crankcase 3 under the cylinder block 1.

The cylinder head 2 and the crankcase 3 are secured to the cylinder block 1 by coupling bolts.

Figure 3:
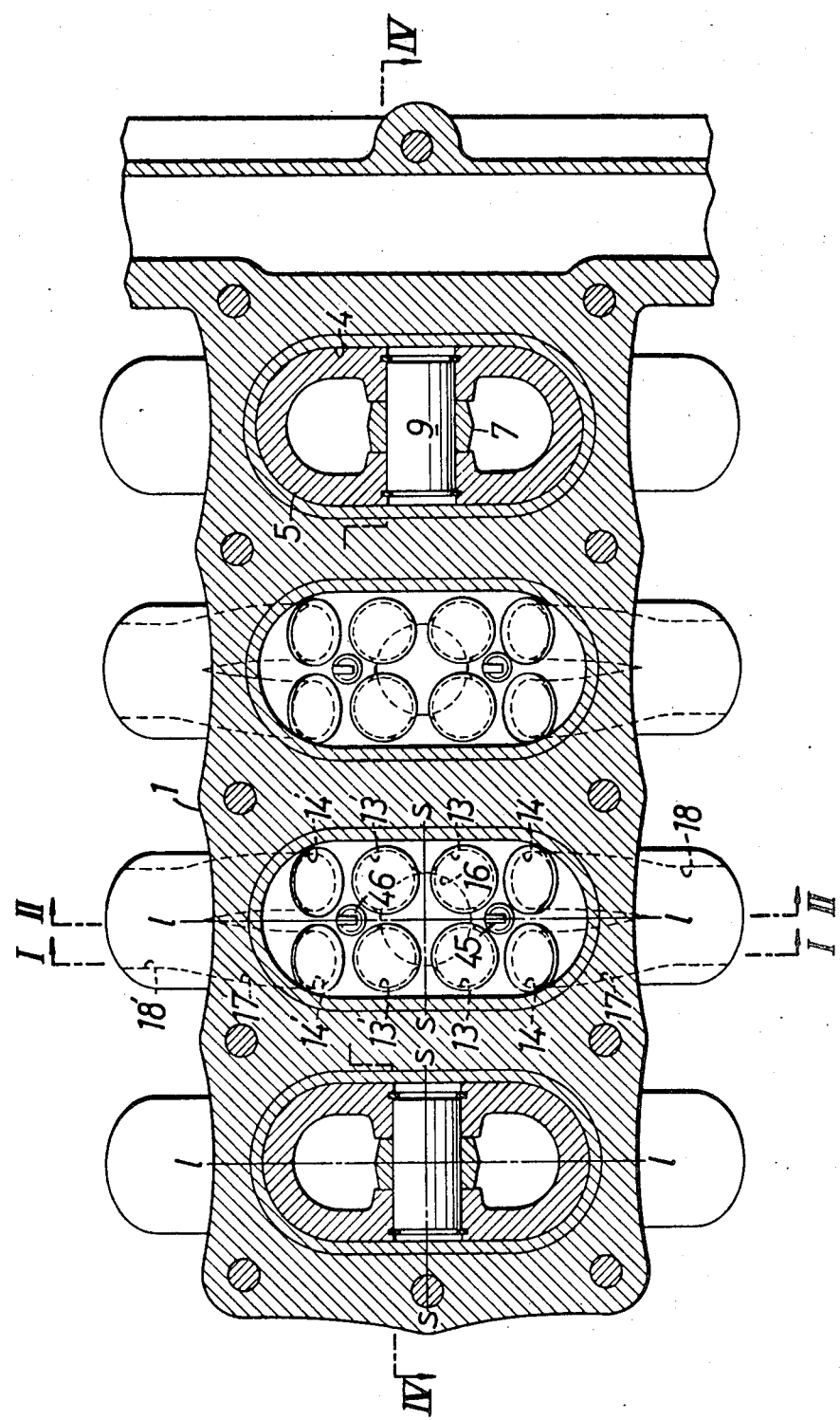
FIG. 3 is a sectional view taken along lines III—III in FIG. 4.
Figure 4:
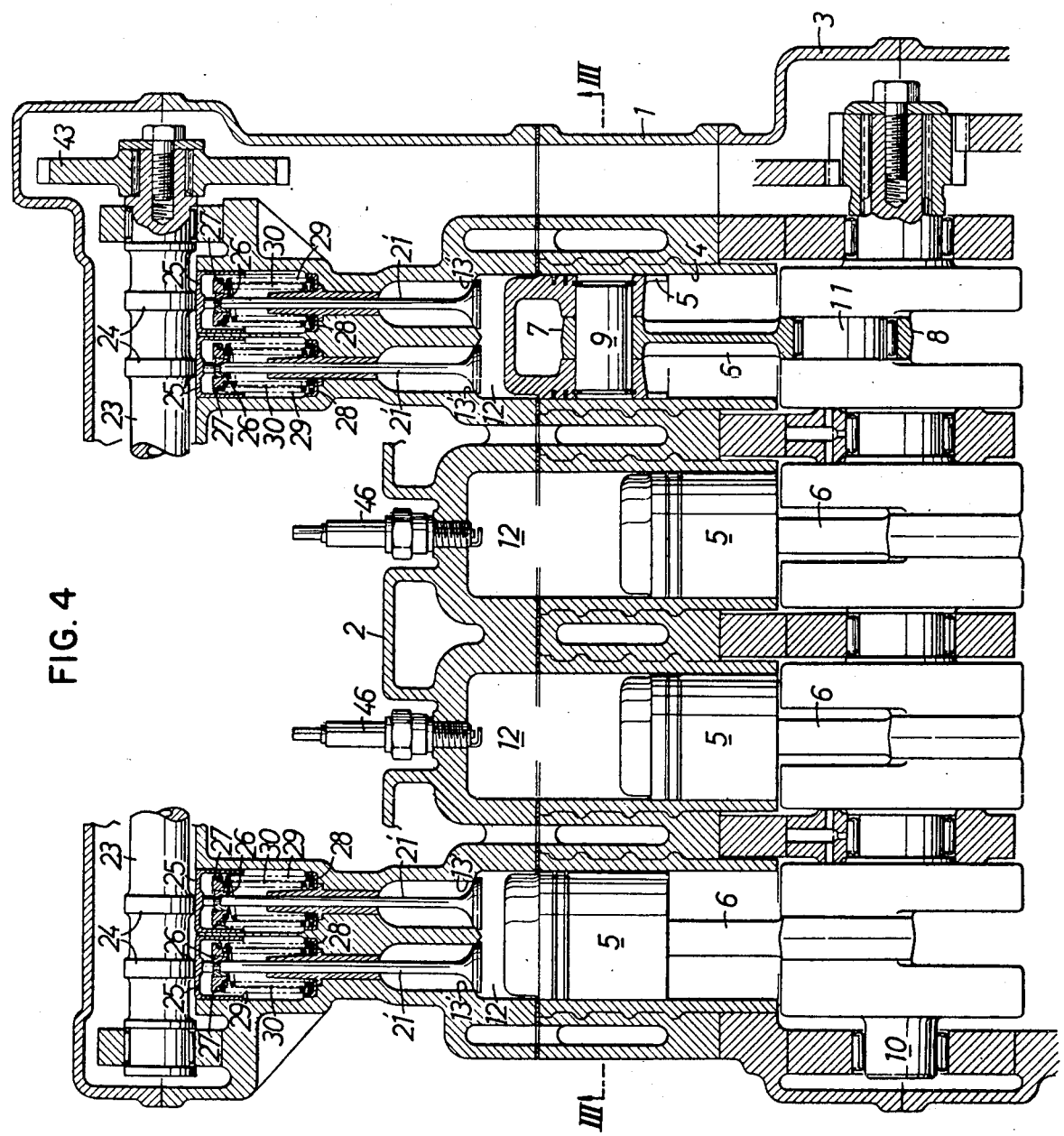
FIG. 4 is a sectional view taken along lines IV—IV in FIG. 3.

As shown in FIGS. 3 and 4, the block 1 is provided with four cylinder bores 4 extending adjacent one another in parallel relation in a row. The bores 4 are non-circular in cross-section and, for example, can be of elongated circular shape or elliptical shape in cross-section. The non-circular bores have major axes l—l which are parallel to one another and extend laterally with reference to the longitudinal direction of the cylinder block 1. The non-circular bores have minor axes S—S which are aligned in the longitudinal direction of the cylinder block 1. In the illustrated embodiment, the cross-section is substantially elongated and the ratio of the length in the longitudinal direction to the transverse direction is 2:1. Each of the four cylinder bores 4 slidably receives a piston 5 of elongated circular or elliptical cross-section corresponding to the cross-section of the bore 4. Each piston 5 is connected to the small diameter end 7 of a connecting rod 6 through a piston pin 9, and the large diameter end 8 of each connecting rod 6 is connected to a respective crank pin 11 of a crankshaft 10 rotatably supported in the crankcase 3. The axis of rotation of the crankshaft 10 intersects a vertical plane passing through the major axes l—l of the elongated circular or elliptical cross-sections of the four cylinder bores 4 at right angles. A combustion chamber 12 is formed in the cylinder head 2 for each cylinder. Each combustion chamber 12 has an elongated circular or elliptical shape in horizontal cross-section and the upper wall of the combustion chamber 12 is of circular arc shape in a vertical plane passing through the major axis l—l. The base of the combustion chamber merges with the bore of the cylinder. The cylinder bores and combustion chambers are substantially symmetrical in cross-section around longitudinal axes l—l and transverse axes S—S. Vertical planes passing through the longitudinal and transverse axes l—l and S—S of each cylinder intersect along a vertical axis L—L which passes centrally through the cylinder bore and the associated combustion chamber. In each combustion chamber there is an inner, central region proximate the transverse axis S—S and an outer, remote region more distant from transverse axis S—S. In the inner, central region of each combustion chamber 12, two pairs of inlet valve ports 13, 13 and 13', 13' are formed in the cylinder head 2 and open equidistantly in relation to the vertical axis L—L of the cylinder bore 4 and substantially equally spaced from each other. In the outer, remote region of the combustion chamber 12 two pairs of exhaust valve ports 14, 14 and 14', 14' are formed in the cylinder head 2 and open laterally in relation to a vertical plane passing through axis S—S. Spark plugs 45 and 46 are installed in the wall of the combustion chamber 12 along the axis l—l and plug 45 is surrounded by the pair of inlet valve ports 13 and 13 and the pair of exhaust valve ports 14 and 14, while plug 46 is surrounded by the pair of inlet valve ports 13' and 13' and the pair of exhaust valve ports 14' and 14'.

The two pairs of inlet valve ports 13, 13 and 13', 13' are respectively connected to four inlet passages 15, 15 and 15', 15' formed in the cylinder head 2, and the inlet passages 15, 15 and 15', 15' are jointly connected to a single main inlet duct 16 formed in the cylinder head 2, to form an inlet system I. The outer end of inlet system I is connected to a carburetor 19 to receive a fuel-air mixture therefrom.

Similarly, the two pairs of exhaust valve ports 14,14 8and 14', 14' are respectively connected to two pairs of exhaust passages 17, 17 and 17', 17', and the two pairs of exhaust passages 17, 17 and 17', 17' are respectively connected to single main exhaust ducts 18 and 18', forming exhaust systems E and E'. The outer ends of the exhaust systems E and E' are connected to exhaust pipes 20 and 20' respectively.

Figure 1:
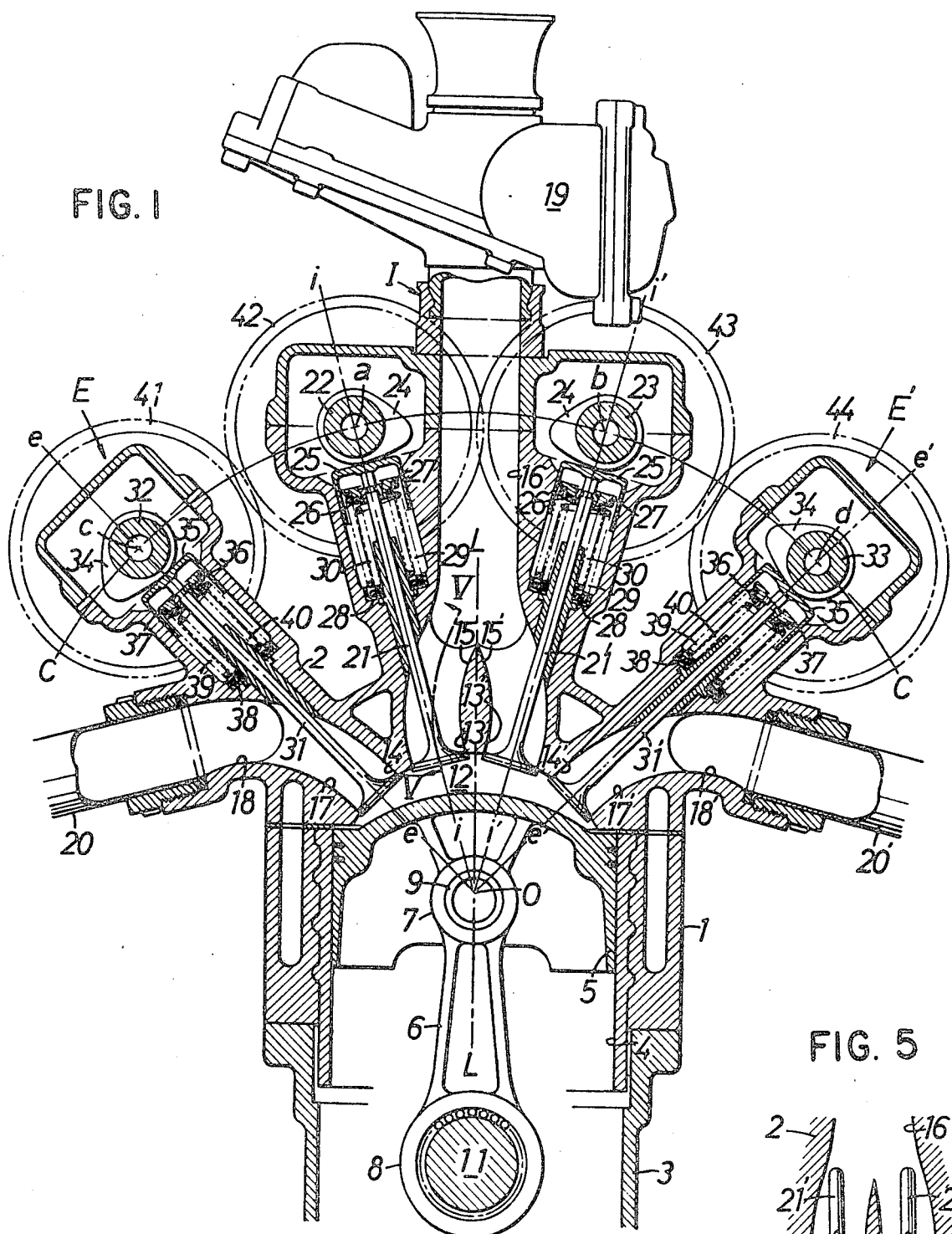
FIG. 1 is a sectional view taken along lines I—I in FIG. 3.
Figure 5:
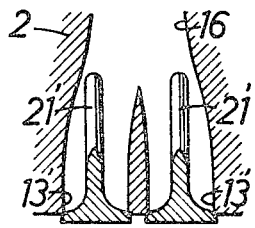
FIG. 5 is a partial sectional view taken along lines V—V in FIG. 1.
Figure 2:
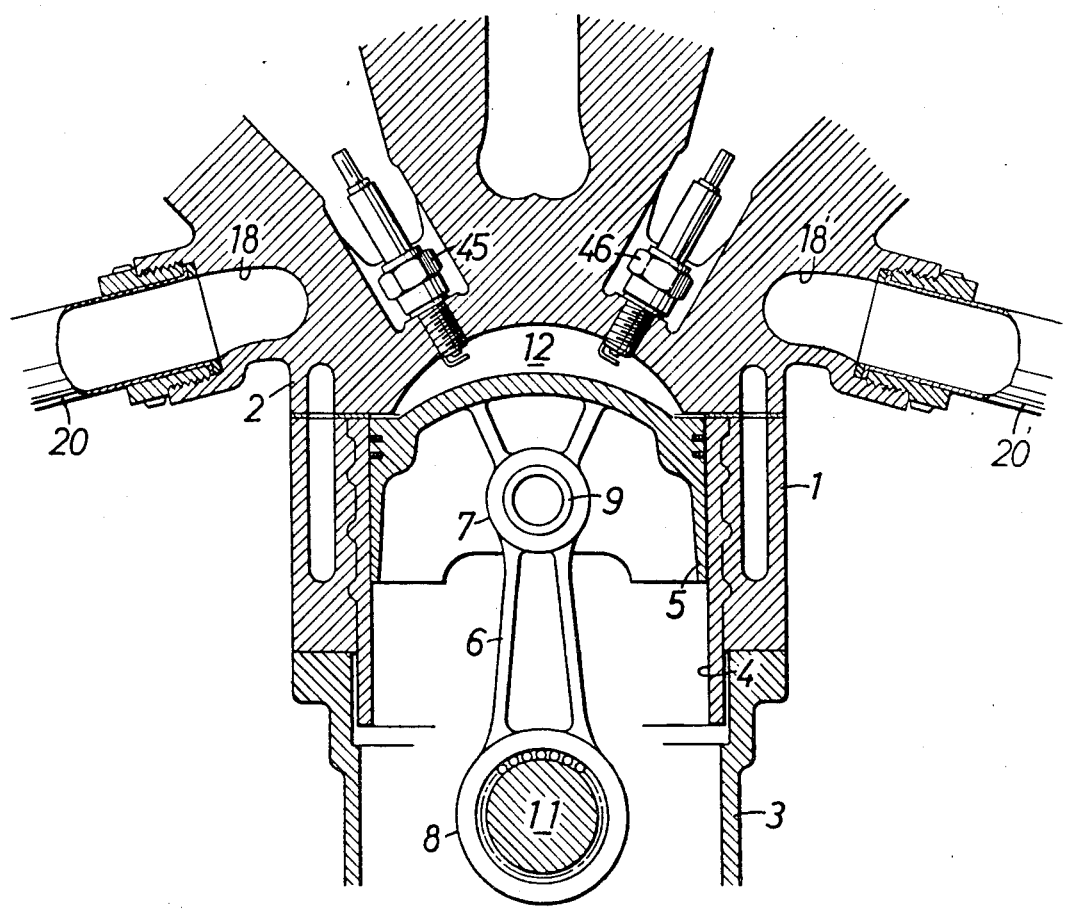
FIG. 2 is a sectional view taken along lines II—II in FIG. 1.

In the cylinder head 2 are mounted two pairs of inlet valves 21, 21 and 21', 21' for cooperating with the two pairs of inlet valve ports 13, 13 and 13', 13'. The inlet valves 21, 21 and 21', 21' are arranged in two parallel planes equally spaced from a vertical plane passing through axis l—l, and as seen in FIG. 1, the valves are inclined outwardly at substantially equal angles with respect to a vertical plane passing through transverse axis S—S so as to surround the main inlet duct 16. Mounted above the pairs of inlet valves 21, 21 and 21', 21', are inlet valve camshafts 22 and 23, each supported rotatably by the cylinder head 2. The camshafts 22 and 23 extend parallel to the crankshaft 10. Cams 24 on the inlet valve camshafts 22 and 23 respectively act through tappets 25 on the inlet valves 21, 21 and 21', 21'. A valve seat 27 is secured by a cotter pin 26 at each of the upper ends of the intake valves 21, 21 and 21', 21', and valve springs 29 and 30 are placed between each valve seat 27 and a valve bearing surface 28 formed on the cylinder head 2.

Additionally mounted in the cylinder head 2 are two pairs of exhaust valves 31, 31 and 31', 31' for cooperating with the two pairs of exhaust valve ports 14, 14 and 14', 14'. The exhaust valves 31, 31 and 31', 31' are inclined outwardly at substantially equal angles with respect to a vertical plane passing through transverse axis S—S to extend above respective exhaust ducts 18 and 18'. Mounted above the pairs of exhaust valves 31, 31 and 31', 31' are exhaust valve camshafts 32 and 33, each supported rotatably by the cylinder head 2 and extending parallel to the crankshaft 10. Cams 34 on the exhaust valve camshafts 32 and 33 respectively act through tappets 35 on the exhaust valves 31, 31 and 31', 31'. A valve seat 37 is connected by a cotter pin 36 to each of the upper ends of the exhaust valves 31, 31 and 31', 31', and valve springs 39 and 40 are placed between each valve seat 37 and a valve bearing surface 38 formed on the cylinder head 2.

Longitudinal center lines i—i and i'—i' of the two pairs of inlet valves 21, 21 and 21', 21' and longitudinal center lines e—e and e'—e' of the two pairs of exhaust valves 31, 31 and 31', 31' extend in two vertical planes parallel to a vertical plane passing through the major axis l—l and on opposite sides thereof as evident from FIGS. 1, 3 and 4. In each of said two vertical planes, the center lines i—i and i'—i' of the inlet valves and the center lines e—e and e'—e' of the exhaust valve intersect at a common point 0 on a line parallel to the aixs of rotation of crankshaft 10 and in a vertical plane passing through transverse axis S—S. Centers of rotation a, b and c, d of the two inlet valve camshafts 22, 23 and two exhaust valve camshafts 32, 33 are at the respective intersection points of the longitudinal center lines i—i, i'—i' and e—e, e'—e' of the inlet valves 21, 21 and 21', 21' and the exhaust valves 31, 31 and 31', 31' with a circular arc C—C whose center is at 0, the centers of rotation a, b, c, d being equally spaced on the circular arc C—C. Secured to the inlet valve camshafts 22, 23 and the exhaust valve camshafts 32, 33 are gears 41, 42 and 43, 44 having the same diameter. The gears 41 to 44 are engaged with each other in sequence and are coupled to the crankshaft 10 through a driving mechanism (not shown).

The operation of the embodiment of the invention is as follows.

During inlet strokes of the engine when the piston 5 moves downwardly, the inlet valve camshafts 22 and 23 rotate so that the two pairs of inlet valves 21, 21 and 21', 21' are both opened, and the fuel mixture, adjusted to a proper air-fuel ratio by the carburetor 19, is divided from the single main inlet duct 16 into the four inlet passages 15, 15 and 15', 15' to flow into the combustion chamber 12 in said inner region thereof. In this case, the two pairs of inlet valves 21, 21 and 21', 21' surround the main inlet duct 16 in symmetrical disposition with respect to the longitudinal axis L—L of the cylinder bore 4, so that the mixture is divided equally from the single main inlet duct 16 into the four inlet passages 15, 15 and 15', 15' for flow into the combustion chamber 12. The mixture flowing in the combustion chamber 12 at said inner region is equall divided left and right with respect to axis l—l and is ignited in proximity to the end of the compression stroke (during which the piston moves upwardly) by spark ignition of the spark plugs 45 and 46 to effect combustion. The combustion flame is propagated from said inner region of the combustion chamber 12 to its left and right outer regions. Therefore, after the ignition, the combustion flame propagates over a distance as short as about ½ of the length of the combustion chamber along major axis l—l thereby curtailing the combustion duration.

In the exhaust strokes of the engine, the exhaust ports are opened and exhaust gas is discharged through the two pairs of exhaust ports 17, 17 and 17', 17' at the ends of the combustion chamber 12. The exhaust gases then flow to the main exhaust ducts 18 and 18' to the exhaust pipes 20 and 20'.

As seen from the foregoing, in accordance with this invention, the fuel inlet system is adapted to introduce fuel mixture to the central region of the combustion chamber of elongated circular or elliptical cross-section and the exhaust system is connected to each end of the combustion chamber in the outer region thereof, so that the combustion flame propagates evenly from the central region to the outer region to minimize combustion duration, whereby rapid and proper combustion can take place to increase the combustion efficiency substantially.

Furthermore, cold fuel mixture is introduced into the central region of the combustion chamber to provide effective cooling of the piston head leading to longer life.

Although the invention has been described in conjunction with a particular embodiment thereof, it will become apparent to those skilled in the art that numerous modifications and variations of the embodiment can be made without departing from the scope and spirit of the invention as defined in the attached claims.

What is claimed is:

1. A four-cycle internal combustion engine comprising a cylinder block having a cylinder bore therein, a piston slidably fitted in said bore, a cylinder head on said block, said cylinder head being provided with a combustion chamber merging with said cylinder bore, said piston, cylinder bore and combustion chamber having a transverse cross-section of non-circular shape with a major longitudinal axis and a minor transverse axis, vertical planes passing through said longitudinal and transverse axes intersecting along a central axis passing through the center of the cylinder bore and combustion chamber, said combustion chamber having a central region and an outer region, inlet means including inlet valves for introducing fuel mixture into said combustion chamber only in said central region of the combustion chamber and discharge means including discharge valves for discharging exhaust gases from said combustion chamber only at said outer region of said combustion chamber, said inlet valves all being arranged around said central axis at substantially equal distances therefrom, said discharge valves all being arranged around said central axis at substantially equal distances therefrom, the distance of said inlet valves from said central axis being less than the distance of said discharge valves from said central axis, said inlet valves of said inlet means comprising a pair of inlet valves on opposite sides of said vertical plane passing through transverse axis, said discharge valves of said discharge means comprising a pair of exhaust valves on opposite sides of said vertical plane passing through transverse axis in said outer region outside said inlet valves, wherein said pairs of inlet valves and exhaust valves are arranged along a common line in a row substantially parallel to the major longitudinal axis and wherein the exhaust valves are outside the inlet valves.

2. An engine as claimed in claim 1 wherein said transverse cross-section is an elongated circle.

3. An engine as claimed in claim 1 wherein said transverse cross-section is elliptical.

4. An engine as claimed in claim 1 wherein said central region is proximate said central axis and said outer region is remote from said central axis.

5. An engine as claimed in claim 1 wherein said combustion chamber in vertical section along said longitudinal axis has an outer wall of circular arc shape.

6. An engine as claimed in claim 5 wherein said inlet means and discharge means respectively include inlet and exhaust ports arranged at the outer wall of said combustion chamber and with which said valves cooperate.

7. An engine as claimed in claim 1 wherein said combustion chamber has an upper wall of arcuate shape in longitudinal cross-section, said inlet valves and exhaust valves being mounted in arcuate array in said upper wall of said combustion chamber.

8. An engine as claimed in claim 7 wherein said valves are arranged in two rows, each in said arcuate array, the valves in each row acting along axes which converge at a common point.

9. An engine as claimed in claim 1 wherein said inlet means and discharge means are respectively located in symmetrical disposition with regard to said central axis.

10. An engine as claimed in claim 9 wherein said inlet means and discharge means are each respectively located on opposite sides of both said vertical planes passing through said longitudinal and transverse axes.

11. An engine as claimed in claim 1 wherein said inlet and discharge valves are inclined along lines which intersect at a common point.

12. An engine as claimed in claim 11 wherein said inlet means comprising a second pair of inlet valves, and said discharge means comprising a second pair of exhaust valves, said two of said pairs of inlet valves and two of said pairs of exhaust valves are arranged in each combustion chamber, respectively, in two of said vertical planes which are parallel to the vertical plane passing through the major longitudinal axis.

13. An engine as claimed in claim 12 wherein said inlet means further comprises an inlet duct supplying fuel mixture to said inlet ports, said inlet valves being positioned in an arrangement around said duct.

14. An engine as claimed in claim 12 comprising a crankshaft connected to said pistons and rotatable about an axis, the associated pairs of inlet and exhaust valves in each plane intersecting at common points on a line parallel to the axis of rotation of said crankshaft, and rotatable camshafts including cams thereon for acting on said valves, said camshafts being located on a circle whose center is on said line.

15. An engine as claimed in claim 14 wherein said camshafts are equally spaced on said circle.

16. An engine as claimed in claim 12 comprising two spark plugs in each combustion chamber surrounded by respective pairs of inlet and exhaust valves on opposite sides of said vertical plane passing through said transverse axis.

17. An engine as claimed in claim 16 wherein said spark plugs are disposed in said vertical plane passing through said major longitudinal axis, said spark plugs being symmetrically disposed on opposite sides of said vertical plane passing through said minor transverse axis between said respective pairs of inlet and exhaust valves.

* * * * *